United States Patent
Briehl et al.

Patent Number: 5,195,656
Date of Patent: Mar. 23, 1993

[54] ACCURATELY CONTROLLED FLUID DISPENSER WITH UPPER AND LOWER STROKE ADJUSTERS

[75] Inventors: Martin J. Briehl, Scottsdale; Kristin F. Cocking, Paradise Valley; Albert J. Laninga, Tempe, all of Ariz.

[73] Assignee: Motorola, Inc., Schaumburg, Ill.

[21] Appl. No.: 753,534

[22] Filed: Sep. 3, 1991

[51] Int. Cl.$^5$ .............................................. G01F 11/00
[52] U.S. Cl. ...................................... 222/1; 222/135; 222/309; 222/340; 222/494
[58] Field of Search ................... 222/1, 135, 309, 334, 222/380, 386, 494

[56] References Cited

U.S. PATENT DOCUMENTS

| | | | |
|---|---|---|---|
| 4,046,291 | 9/1977 | Goda | 222/380 X |
| 4,526,294 | 7/1985 | Hirschmann et al. | 222/309 X |
| 4,545,507 | 10/1985 | Barall | 222/334 X |
| 4,554,134 | 11/1985 | Tervamaki et al. | 222/309 X |
| 4,988,015 | 1/1991 | Price | 222/1 |
| 5,022,556 | 6/1991 | Dency et al. | 222/1 |
| 5,058,779 | 10/1991 | Sordilla | 222/334 |
| 5,127,547 | 7/1992 | Gerich | 222/334 X |

FOREIGN PATENT DOCUMENTS 529107  5/1954  Belgium .............................. 222/309

OTHER PUBLICATIONS

"Automatic System Dispenser, Plunger Pump MP103", Iwashita Engineering Ltd., Feb. 1988.

Primary Examiner—Andres Kashnikow
Assistant Examiner—Joseph A. Kaufman
Attorney, Agent, or Firm—Joe E. Barbee

[57] ABSTRACT

A dispenser (10, 32) that provides accurate control of the material dispensed has an upper adjuster (27) which is used to adjust the distance that the dispenser's (10, 32) plunger (23) is withdrawn from the dispenser's (10, 32) material reservoir (17), and a separate lower adjuster (28) to adjust the distance that the plunger (23) is inserted into the cavity (17) to dispense the material. The dispenser (10, 32) also includes a nozzle (16) and a nozzle plate (14, 14') that are formed from a dimensionally stable material in order to provide accurate control of the dispensing rate and the position of the nozzle. These features facilitate utilizing the dispenser (10, 32) as a portion of a multiple nozzle dispenser system (32) that accurately controls the rate at which material is emitted.

19 Claims, 2 Drawing Sheets

ACCURATELY CONTROLLED FLUID DISPENSER WITH UPPER AND LOWER STROKE ADJUSTERS

BACKGROUND OF THE INVENTION

The present invention relates, in general, to dispensing of fluids, and more particularly, to a novel dispenser that accurately controls the amount of material dispensed.

In the past, the semiconductor industry had used dispensers to administer small amounts of viscous fluids onto semiconductor packages and other workpieces. These previous dispensers typically had a plunger which was used to push a material to be dispensed from the dispenser's storage cavity. As the plunger moved through the cavity, it pushed the material through the cavity and out a small opening or orifice in a nozzle.

One disadvantage of previous dispensers was controlling the distance that the plunger was withdrawn from the cavity in order to load the material into the cavity. Typically, the plunger was raised until encountering an abutment or stop that was machined into the dispenser's body. These abutments were not adjustable, consequently, it was difficult to accurately control the amount of material that was loaded into the cavity.

Another disadvantage of previous dispensers was the difficulty in creating a multiple nozzle dispensing system that could accurately control the amount of material that was dispensed from each nozzle. Previous dispensers typically had one adjustment which controlled the distance that the plunger was inserted into the cavity. When utilized in a multiple nozzle dispenser system, slight variations among the individual dispensers resulted in a non-uniform emission of material from the multiple nozzle dispenser system. The single adjustment could not provide sufficient control to compensate for the slight variations.

An additional disadvantage of previous dispensers was the method of feeding material into the dispenser. Previous dispensers typically had an input opening or port through which the material was pressure fed into the dispenser. The arrangement of these input ports required multiple nozzle dispenser systems to have a separate material supply connection to each nozzle.

A further disadvantage of previous dispensers was the dimensional stability of the nozzle's output orifice. Typically, these previous dispenser's nozzle was formed from plastic or other similar materials. After repeated usage, the size of the nozzle's orifice could increase thereby altering the rate at which the material was dispensed.

In addition, it was difficult to control the rate at which material was emitted from previous dispensers. Generally, the plunger was rapidly inserted into the dispenser's cavity thereby rapidly emitting the material.

Previous multiple nozzle dispenser systems generally did not permit only selected nozzles to dispense the material, but required every nozzle to dispense simultaneously.

Accordingly, it is desirable to have a dispenser that has a separate adjuster which can vary the distance that the plunger is withdrawn from the cavity, that has a separate adjuster which can vary the distance that the plunger is inserted into the cavity in order to control the amount of material dispensed, that has a nozzle which is made from a dimensionally stable material, that can be utilized in a multiple nozzle dispenser system without having a separate material input connection for each nozzle, and that can control the rate at which the material is dispensed through the nozzle.

SUMMARY OF THE INVENTION

Briefly stated, the present invention includes a dispenser that has an upper stroke adjuster which determines the distance that a plunger is withdrawn from the dispenser's nozzle. The dispenser also has a separate lower stroke adjuster that is used to adjust the amount of the material that is dispensed from the nozzle by adjusting the distance that the plunger is pushed into the nozzle.

DETAILED DESCRIPTION OF THE DRAWINGS

Figure 1:
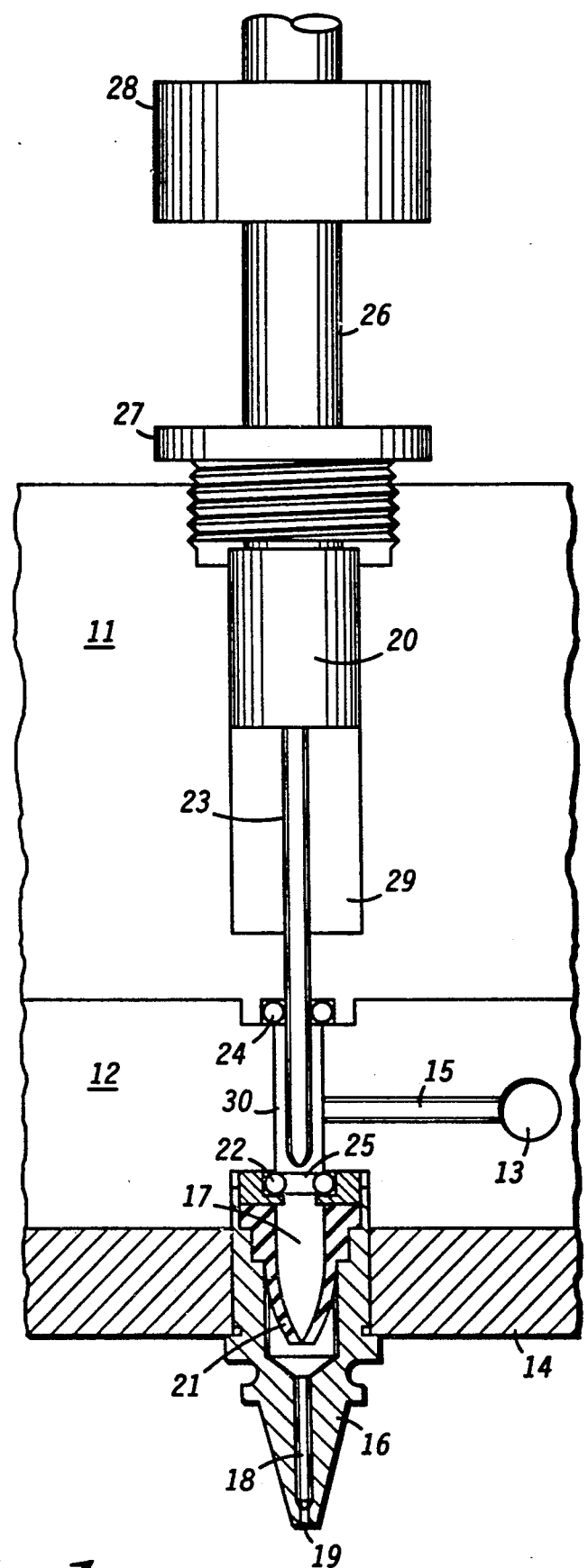
FIG. 1 is an enlarged cross sectional view of an embodiment of a dispenser in accordance with the present invention.

FIG. 1 illustrates a portion of a dispenser 10 that, among other things, can accurately control the amount of a material that is dispensed, and can also accurately control the rate at which the material is dispensed. Dispenser 10 includes a nozzle 16, a nozzle plate 14, a manifold plate 12, and a body 11 that are firmly attached together. Nozzle 16 is a hollow bullet-shaped object that is formed from a rigid dimensionally stable material such as brass, stainless steel, aluminum or other similar material. At the wide end of nozzle 16 there is a nozzle opening 25 through which the material to be dispensed flows into a positive displacement cavity 17. An output orifice 19, that emits the material from dispenser 10, is connected to positive displacement cavity 17 by an output channel 18. The dimensional stability of the material used for nozzle 16 ensures that the size of orifice 19 remains a predetermined size thereby facilitating accurate control of the rate at which the material is emitted from dispenser 10 onto a workpiece. Nozzle 16 is attached to a nozzle plate 14 which is also made from a rigid dimensionally stable material such as brass, stainless steel, aluminum or other similar material. The dimensional stability of nozzle plate 14 insures that nozzle 16 can be accurately positioned relative to a workpiece. In the preferred embodiment, nozzle plate 14 is formed from stainless steel, and nozzle 16 is formed from brass.

Manifold plate 12 is positioned no nozzle plate 14, and is used to feed the material from an external source (not shown) into positive displacement cavity 17. Manifold plate 12 has a manifold opening 30 that is centered to nozzle opening 25, and extends from nozzle opening 25 through manifold plate 12. A feed port 13 that accepts the material from the external supply is an opening that runs through manifold plate 12. One end of feed port 13 is connected to the external material supply. The other end of feed port 13 can be abutted to another dispenser 10 to form a multiple nozzle dispenser system, or may be plugged for use as a single nozzle dispenser. An input channel 15 connects feed port 13 to manifold opening 30 to allow the material to flow into cavity 17. Consequently, the external source of the material is connected to feed port 13 to allow the material to flow into feed port 13, through input channel 15, through manifold opening 30, through nozzle opening 25, and into positive displacement cavity 17. In a multiple nozzle dispenser system, a portion of the material would continue to flow through feed port 13 to an input channel of a second dispenser. Manifold plate 12 can be formed from a variety of materials including plastic and metal. In the preferred embodiment, manifold plate 12 is a polyacetal plastic.

Body 11 is attached to manifold plate 12 and has a body opening 29 which is centered to nozzle opening 25. Within body opening 29 one end of a plunger 23 is connected to a shaft 26 by a guide 20. Consequently, guide 20, plunger 23, and shaft 26 function as a single unit. Plunger 23 has a diameter that is slightly smaller than the diameter of nozzle opening 25 and of manifold opening 30 so that the other end of plunger 23 can be inserted into positive displacement cavity 17 in order to push the material from cavity 17 through output orifice 19. Shaft 26 has a diameter that is larger than plunger 23 and smaller than body opening 29. Guide 20 fits around a portion of shaft 26 and functions to assist in aligning plunger 23 to nozzle opening 25 as plunger 23 is inserted and withdrawn from nozzle 16. Additionally, guide 20 and an upper stroke adjuster 27 are used to limit the distance plunger 23 is withdrawn from cavity 17. As plunger 23 is withdrawn from nozzle 16, guide 20 abuts upper stroke adjuster 27 to terminate the movement of shaft 26. The distance between the end of plunger 23 that is near nozzle 16, and the top of nozzle 16 can be adjusted by moving upper stroke adjuster 27. In the preferred embodiment, upper stroke adjuster 27 is a nut that is screwed into body opening 29. In this embodiment, upper stroke adjuster 27 has an opening through which shaft 26 is inserted. Also in this embodiment, the diameter of the opening is smaller than guide 20 to ensure that guide 20 abuts adjuster 27. By screwing the preferred embodiment of adjuster 27 further into body 11, the space between the top of nozzle 16 and plunger 23 is decreased. The spacing can be increased by raising upper adjuster 27.

A lower stroke adjuster 28 is connected to a portion of shaft 26 that is external to body 11, and is used to determine the maximum distance that plunger 23 is inserted into positive displacement cavity 17. In the preferred embodiment, lower stroke adjuster 28 is a sleeve that fits around and is firmly attached to shaft 26. In this embodiment, lower stroke adjuster 28 abuts upper stroke adjuster 27 to terminate movement of plunger 23 into cavity 17. Consequently, the position of lower stroke adjuster 28 determines the amount of material that is emitted from dispenser 10. Positioning lower stroke adjuster 28 closer to body 11 reduces the amount of material pushed from cavity 17, while positioning lower adjuster 28 further from body 11 increases the amount of material that is pushed from cavity 17.

Typically, a dispense cycle begins with plunger 23 positioned within positive displacement cavity 17. An external reservoir containing the material to be dispensed is connected to feed port 13. A wide variety of materials can be emitted by dispenser 10. The materials generally have viscosities that range from between approximately 500 centipoises and 300,000 centipoises. In the preferred embodiment, the material is a silicone having a viscosity of approximately 2,500 centipoises. Because of the material's viscosity, the external reservoir is generally pressurized to ensure that the material flows from the reservoir into dispenser 10. A lower O-ring 22 that is positioned in nozzle opening 25 presses against plunger 23 and seals nozzle opening 25, thereby preventing the material from entering nozzle 16. Similarly, an upper O-ring 24 is positioned in manifold opening 30 to ensure that the material does not flow into body 11. In order to fill positive displacement cavity 17, shaft 26 is raised until guide 20 abuts upper stroke adjuster 27. Upper stroke adjuster 27 is positioned to ensure that the tip of plunger 23 is not in contact with lower O-ring 22 thereby allowing the material to flow from input channel 15 through nozzle opening 25 into cavity 17. During the time that plunger is withdrawn from nozzle 16, it is possible that the pressure applied to the external reservoir can force some amount of the material through orifice 19. Consequently, plunger 23 typically remains within cavity 17 until a dispense cycle is initiated in order to seal nozzle opening 25 and prevent the material from being emitted. Once a dispense cycle begins, it is important to minimize the time that plunger 23 is withdrawn from nozzle 16 since it is difficult to control the amount of pressure emitted material. The distance that plunger 23 is withdrawn from lower O-ring 22 is determined by the position of upper adjuster 27. Minimizing the distance minimizes the pressure dispensing portion of a dispense cycle, and provides maximum control of the rate of dispensing the material. A check valve 21 prevents any of the material remaining in cavity 17 from a previous dispense cycle from moving toward nozzle opening 25 as plunger 23 is withdrawn. Check valve 21 also prevents air from being drawn into nozzle 16 through orifice 19. In the preferred embodiment, check valve 21 is a flexible rubber flap that is inserted into opening 25. As plunger 23 is withdrawn, the sides of check valve 21 close preventing material from flowing out of cavity 17.

Once the material has filled cavity 17, shaft 26 is lowered thereby pushing plunger 23 past lower O-ring 22 to seal opening 25, and into cavity 17 thereby forcing the material out orifice 19. As plunger 23 is inserted into cavity 17, plunger 23 pushes the material through check valve 21 and out orifice 19. Shaft 26 is lowered until lower stroke adjuster 28 abuts adjuster 27. The portion of a dispense cycle during which plunger 23 is pushing material from cavity 17 through orifice 19 is referred to as the positive displacement portion since plunger 23 is positively displacing the material from cavity 17. Consequently, it can be seen that the total amount of material emitted from dispenser 10 is determined by the distance that plunger 23 is inserted into cavity 17 and that this distance is controlled by upper stroke adjuster 28. This ability of minimizing the pressure portion of the dispense cycle and accurately controlling the positive displacement portion of the dispense cycle, provided by adjusters 27 and 28, is a significant improvement over prior dispensers. By minimizing the pressure portion of the dispense cycle and providing a means to vary the rate at which plunger 23 is inserted into cavity 17, dispenser 10 can have an accurately controlled flow at rates as low as approximately 0.3 micro liters per second. Depending on the material's viscosity, higher flow rates, generally in excess of 3.0 micro liters per second, are easier to obtain. In the preferred embodiment, the flow rate is approximately 0.8 micro liters per second.

Figure 2:
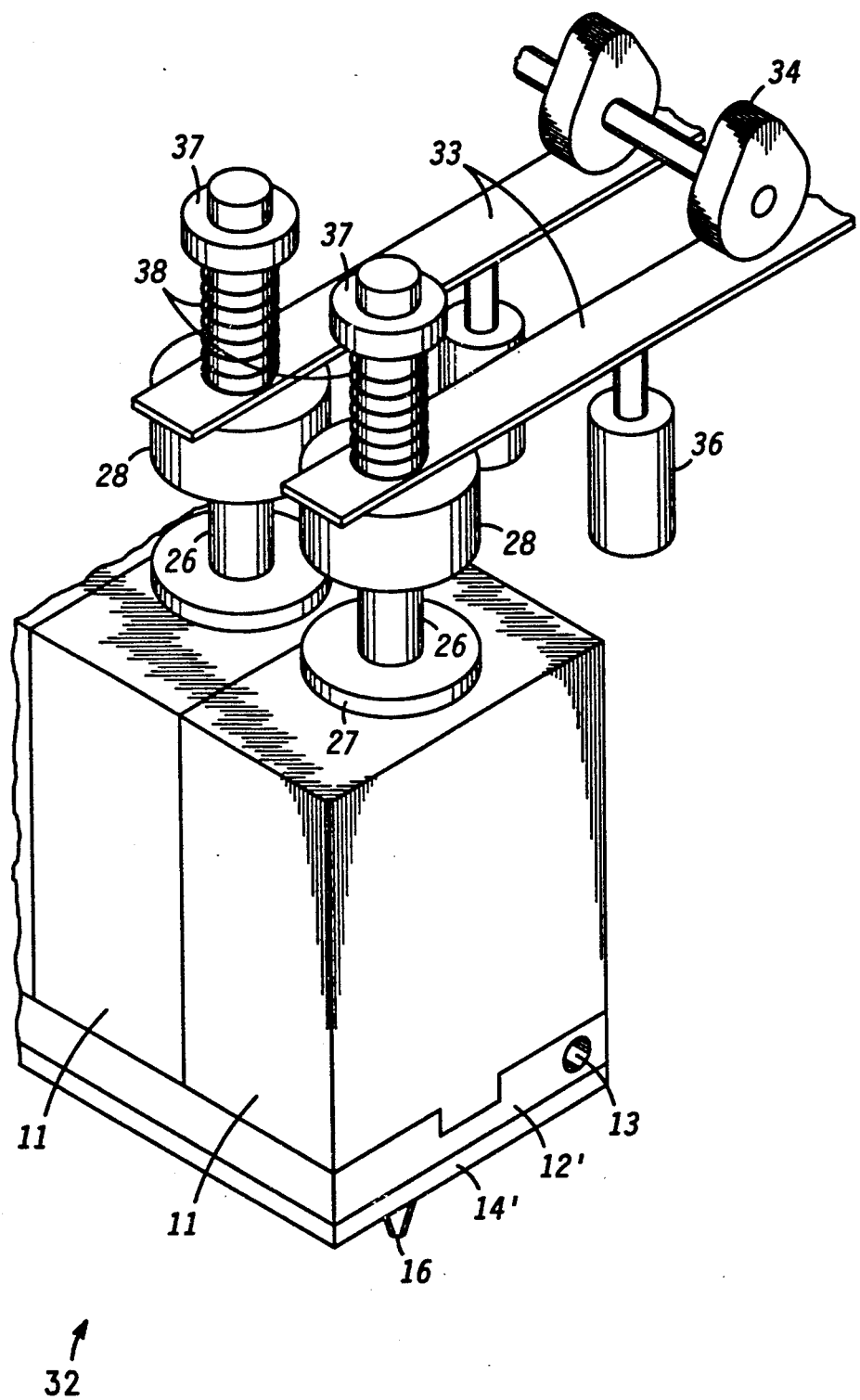
FIG. 2 is a perspective view of a portion of an embodiment of a multiple nozzle dispenser system that utilizes the dispenser of FIG. 1 in accordance with the present invention.

FIG. 2 illustrates a portion of a multiple nozzle dispenser system 32. Nozzle plate 14 that was shown in FIG. 1 has been expanded to a nozzle plate 14' which includes a plurality of nozzles 16. Each nozzle 16 is identical to nozzle 16 shown in FIG. 1. Similarly, manifold plate 12 from FIG. 1 has also been expanded to a manifold plate 12' which accommodates the plurality of nozzles 16. It should be noted that feed port 13 continues through the entire length of manifold plate 12' and that manifold plate 12' has an individual input channel, such as channel 15 shown in FIG. 1, for each nozzle 16. Multiple nozzle dispenser system 32 also has a plurality of bodies 11, a plurality of upper stroke adjusters 27, a plurality of shafts 26, and a plurality of lower stroke adjusters 28 that are all identical to correspondingly numbered elements of FIG. 1.

In addition, multiple nozzle dispenser system 32 has an actuator 34 that is used to control the movement of each shaft 26 toward each nozzle 16. In order to accurately control the rate at which the material is dispensed, the rate at which each plunger 23 is inserted into each nozzle 16 must also be accurately controlled. Such a function is provided by actuator 34 which determines the rate at which each shaft 26 moves over a given amount of time. Actuator 34 can have many different forms such as a bellows, a take-up pulley, linear drive, ball screw, etc. It is important that actuator 34 provide a constant velocity to provide an even flow of the material from nozzle 16. In the preferred embodiment, actuator 34 is a cam or an eccentric wheel that is attached to a motor via a shaft. In this preferred embodiment, actuator 34 presses against a plurality of levers 33 which in turn presses against the plurality of upper stroke adjusters 28. By accurately controlling the rate at which shaft 26 moves, multiple nozzle dispenser 32 can very accurately control the rate at which the material is dispensed onto a workpiece. In addition, multiple nozzle dispenser 32 has a return 36 which is used to lift shaft 26 and remove plunger 23 (shown in FIG. 1) from nozzle 16. Return 36 can have various forms, including a solenoid, a motor, a spring, etc. In the preferred embodiment, return 36 is an air pressure actuated cylinder. Return 36 presses against control arm 33 which pushes a spring 38 against a support 37 in order to apply pressure to shaft 26 and withdraw plunger 23 (shown in FIG. 1) from cavity 17 (see FIG. 1). Spring 38 functions to absorb any travel of return 36 that is in excess of the travel allowed by the setting of adjuster 27.

An additional feature of multiple dispenser 32 is that each nozzle can be independently controlled. That is, each nozzle has an independent return 36. By not actuating a particular return 36, the plunger of that particular nozzle remains in the cavity, and the nozzle is not loaded with the material. Consequently, no material is emitted from that particular nozzle, yet the other nozzles are not affected.

By now it should be appreciated that there has been provided a novel dispenser that can be used in a highly accurate multiple nozzle dispenser system. The ability to separately adjust the upper stroke and lower stroke end points provides highly accurate control over the amount of material that is dispensed and the rate at which the material is dispensed. Forming the nozzle from a dimensionally stable material ensures the output orifice's dimensions are accurately controlled thereby providing further control of the amount of material dispensed. Employing a dimensionally stable nozzle plate ensures that the nozzle is accurately positioned. In addition, the separate upper and lower stroke adjusters provide a mechanism for accommodating variations between dispensers that are used in a multiple nozzle dispenser system. Utilizing a single nozzle plate for all the nozzles of a multiple nozzle dispenser system provides accurate positioning of each nozzle. Utilizing a single manifold plate to feed material to the plurality of nozzles eliminates external tubing and simplifies the material feed connection to the multiple nozzle dispenser system.

We claim:

1. An accurately controlled dispenser assembly comprising:
   a hollow bullet shaped nozzle having a positive displacement cavity for holding a material to be dispensed, an orifice for emitting the material from the nozzle, and a nozzle opening for receiving the material into the positive displacement cavity;
   a nozzle plate having a plate opening through the nozzle plate wherein a portion of the nozzle is inserted through the plate opening so that the orifice is external to the nozzle plate;
   a manifold plate on the nozzle plate wherein the manifold plate has a manifold opening through the manifold plate with the manifold opening centered to the plate opening, an input channel that extends perpendicularly from the manifold opening, an input port that is an opening through the manifold plate wherein the input port intersects with the input channel to allow the material to flow from the input port through the input channel then through the manifold opening and into the positive displacement cavity;
   a body on the manifold plate wherein the body has a body opening that is through the body and is centered to the manifold opening;
   an upper stroke adjuster that is positioned within the body opening, and that has a shaft opening which is centered to the body opening;
   a shaft extending through the shaft opening;
   a plunger having a first end that fits through the nozzle opening to push the material from the positive displacement cavity through the orifice, and a second end;
   a guide that attaches the second end of the plunger to the shaft wherein the guide has a diameter that is larger than the shaft opening so that the guide abuts the upper stroke adjuster to terminate travel of the shaft and of the plunger in a direction away from the nozzle; and
   a lower stroke adjuster attached to a portion of the shaft that is external to the body wherein the lower stroke adjuster abuts the upper stroke adjuster to terminate travel of the shaft and of the plunger in a direction toward the nozzle.

2. The dispenser assembly of claim 1 wherein the upper stroke adjuster is a nut that screws into the body opening.

3. The dispenser assembly of claim 1 wherein the lower stroke adjuster is a metal sleeve that is attached to the shaft.

4. The dispenser assembly of claim 1 wherein the nozzle is formed from brass.

5. The dispenser assembly of claim 1 wherein the material has a viscosity between 500 centipoises and 300,000 centipoises.

6. The dispenser assembly of claim 1 further including an actuator that moves the shaft toward the nozzle at a predetermined rate in order to emit a portion of the material from the orifice at a predetermined rate.

7. The dispenser assembly of claim 6 wherein the predetermined rate is greater than approximately 0.3 micro liters per second.

8. The dispenser assembly of claim 6 wherein the actuator is a cam driven by a motor.

9. The dispenser assembly of claim 1 further including a return that moves the shaft in a direction away from the nozzle.

10. The dispenser assembly of claim 8 wherein the return is a pressure actuated cylinder.

11. A multiple nozzle dispenser system comprising:
a plurality of nozzles wherein each nozzle has an orifice for dispensing a material and a positive displacement cavity for storing the material;
a nozzle plate having a plurality of nozzle openings with the plurality of nozzles positioned through the plurality of nozzle openings;
a manifold plate on the nozzle plate wherein the manifold plate has an input port that is an opening through the manifold plate, and has a plurality of input channels that connect the input port to the plurality of nozzles;
a plurality of bodies on the manifold plate wherein the plurality of bodies is centered to the plurality of nozzles;
a plurality of shafts extending from the plurality of bodies wherein the plurality of shafts move toward the plurality of nozzles to emit a portion of the material from each orifice, and moves away from the plurality of nozzles to fill each positive displacement cavity with the material;
a plurality of upper stroke adjusters that terminate movement of the plurality of shafts away from the plurality of nozzles at a first predetermined position;
a plurality of lower stroke adjusters that terminate movement of the plurality of shafts toward the plurality of nozzles at a second predetermined position.

12. The dispenser of claim 11 wherein the plurality of upper stroke adjusters include a plurality of nuts that are screwed into the plurality of bodies, and that have a plurality of shaft openings through which the plurality of shafts are inserted wherein the plurality of nuts are unscrewed to move the first predetermined position away from the plurality of nozzles and screwed further into the plurality of bodies to move the first predetermined position closer to the plurality of nozzles.

13. The dispenser of claim 11 wherein the plurality of lower stroke adjusters include a plurality of sleeves attached to the plurality of shafts wherein each sleeve is moved toward the plurality of nozzles to move the second predetermined position closer to the plurality of nozzles and is moved away from the plurality of nozzles to move the second predetermined position away from the plurality of nozzles.

14. The dispenser of claim 11 wherein the material is a silicone material.

15. The dispenser of claim 11 wherein the material has a viscosity of between approximately 500 centipoises and 300,000 centipoises.

16. A method of dispensing a material comprising:
filling a positive displacement cavity within a nozzle with a material to be dispensed by withdrawing a plunger from the nozzle;
stopping withdrawal of the plunger at a first predetermined point that is determined by a position of an upper stroke adjuster;
varying the first predetermined point by varying the position of the upper stroke adjuster;
controlling a rate of emitting the material from the nozzle by controlling a velocity at which the plunger is inserted into the positive displacement cavity;
stopping the material emission at a second predetermined point by abutting a lower stroke adjuster to the upper stroke adjuster; and
varying the second predetermined point by varying the position of the lower stroke adjuster.

17. The method of claim 16 wherein varying the first predetermined point includes screwing a nut into the dispenser in order to move the first predetermined point closer to the nozzle, and screwing the nut out of the dispenser to move the first predetermined point away from the nozzle.

18. The method of claim 16 wherein varying the second predetermined point includes moving the lower stroke adjuster away from the nozzle to move the second predetermined point closer to the nozzle, and moving the lower stroke adjuster toward the nozzle to move the second predetermined point away from the nozzle.

19. The method of claim 16 wherein controlling the rate of emitting the material from the nozzle includes emitting the material at a rate in excess of approximately 0.3 micro liters per second.

* * * * *